United States Patent [19]

Beckwith et al.

[11] Patent Number: 4,686,095

[45] Date of Patent: Aug. 11, 1987

[54] METHOD OF MAKING ULTRAPURE SILICON NITRIDE PRECURSOR

[75] Inventors: Elaine C. Beckwith, Riverview; Robert M. Williams, Livonia, both of Mich.

[73] Assignee: Ford Motor Company, Dearborn, Mich.

[21] Appl. No.: 812,036

[22] Filed: Dec. 23, 1985

[51] Int. Cl.$^4$ .............................................. C01B 33/00
[52] U.S. Cl. ..................................... 423/324; 423/344; 423/351; 423/311
[58] Field of Search ................. 423/324, 351, 371, 344

[56] References Cited

U.S. PATENT DOCUMENTS

| | | | |
|---|---|---|---|
| 3,839,541 | 10/1974 | Lumby et al. | 423/344 |
| 3,959,446 | 5/1976 | Mazdiyasni et al. | 423/344 |
| 4,122,220 | 10/1978 | Sussmuth | 501/97 |
| 4,145,224 | 3/1979 | Mehalchick et al. | 423/344 |
| 4,196,178 | 4/1980 | Iwai et al. | 423/344 |
| 4,397,828 | 8/1983 | Seyferth et al. | 423/324 |

OTHER PUBLICATIONS

Glemser and Naumann, "Über den thermischen Abbau von Siliciumdiimid Si(NH)$_2$", *Zeitschrift fur Anorganiche und Allgemeine Chemie*, Band 298, 134–141 (1959).

*Primary Examiner*—John Doll
*Assistant Examiner*—Lori S. Freeman
*Attorney, Agent, or Firm*—Leonard Tachner

[57] ABSTRACT

Ultrapure silicon nitride precursor is made by: (a) continuously reacting liquid silicon halide (SiCl$_4$) with an excess of liquid ammonia (NH$_3$) (i) in the effective absence of contaminants, (ii) at a reaction situs in an inert atmosphere to form the silicon nitride precursor as a precipitate, and (iii) with a ratio of liquid ammonia to silicon halide (equal to or greater than 21 molar) effective to solubilize any gas reaction products; (b) providing a pressure differential to simultaneously and continuously withdraw a filtered portion of the excess liquid ammonia to leave the silicon nitride precursor precipitate in the reaction situs; and (c) adding ammonia to the excess of ammonia in said reaction situs to replace the withdrawn filtered portion of the liquid ammonia.

The reaction is carried out with vigorous stirring of the liquid mixture and the atmosphere over the entire mixture is regulated to contain only ammonia vapor and nitrogen. The temperature of the liquid mixture is maintained between −33° C. to −69° C. by employing a cooling jacket containing dry ice, a slush of dry ice and acetone, isopropanol or cellosolve, and by recycling the withdrawn liquid ammonia and re-adding it to the reaction situs either as a cooling liquid or as a heating gas.

27 Claims, 1 Drawing Figure

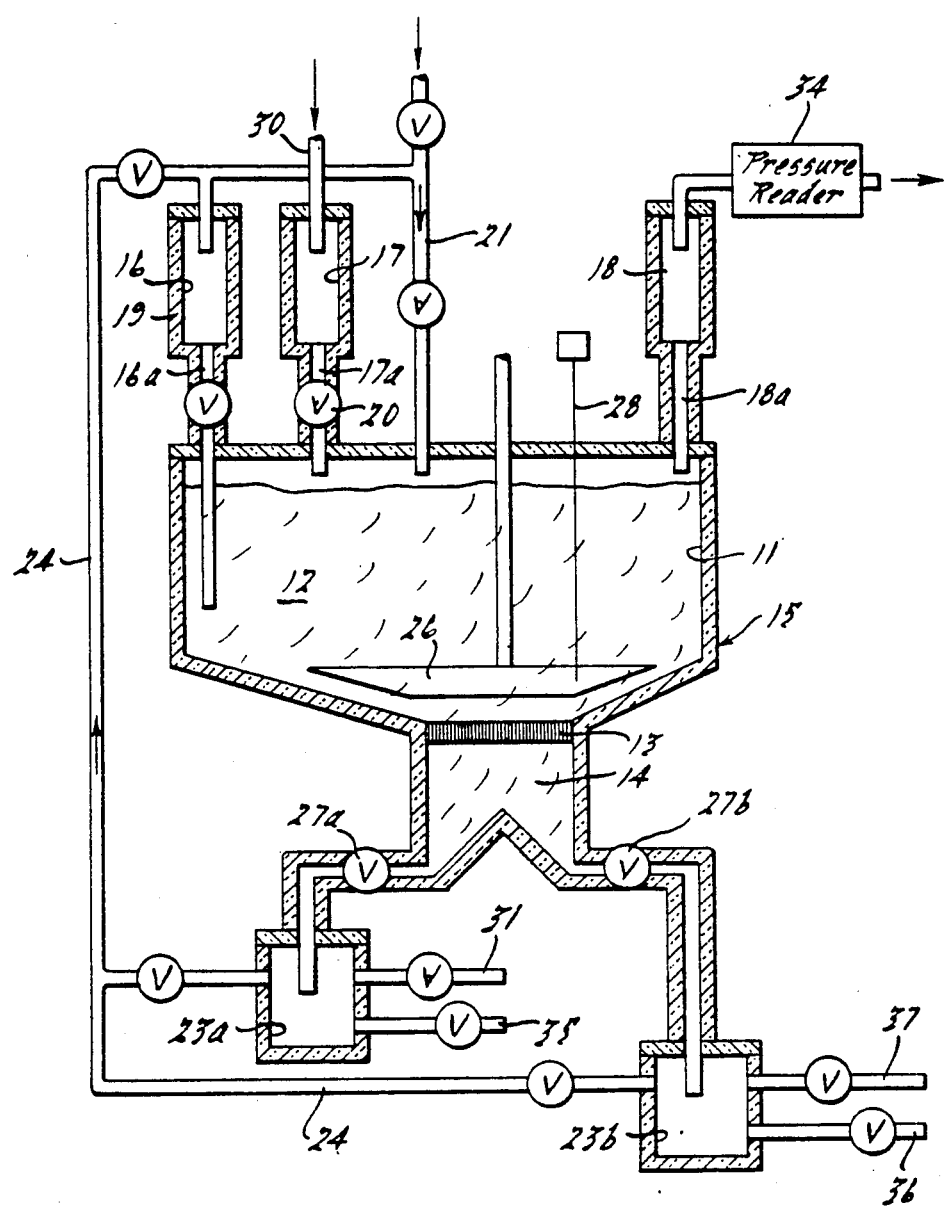

METHOD OF MAKING ULTRAPURE SILICON NITRIDE PRECURSOR

BACKGROUND OF THE INVENTION

1. Field of the Invention

The invention relates to the art of making silicon compounds and, more particularly, to making ultrapure silicon imides or amides useful as precursors for making silicon nitride.

2. Description of the Prior Art

Silicon nitride does not occur in natural deposits in processible quantities. It must be chemically formed and processed. The principal methods by which silicon nitride has been made heretofore, include: (1) reacting nitrogen gas with silicon powder at a high temperature, but which temperature is below the melting point of silicon (see U.S. Pat. No. 3,839,541); (2) reduction of silica coupled with gas nitriding at high temperatures (see German Pat. No. 88999 to Mehner); and (3) vapor phase reaction of a silicon halide (i.e., $SiCl_4$) and ammonia in a gas-to-gas reaction at 1100°–1350° C. (see U.S. Pat. No. 4,145,224); and (4) formation of silicon imide or amide and subsequent thermal decomposition of such imide or amide. Silicon imide has the formula $Si(NH)_2$, whereas silicon amide has the formula $Si(NH_2)_4$.

Silicon amide or imide has been formed by any one of the following: (a) a liquid-to-gas reaction of silicon halide and ammonia in the presence of benzene or hexane at −10° C. to 5° C. for 0.5-2 hours (see U.S. Pat. No. 3,959,446); (b) a solid-to-gas reaction of silicon halide and ammonia at about −196° C. (see O. Glemser and P. Naumann, "Uber den thermischen Abbau von Siliciumdiimid $Si(NH)_2$", *Zeitschrift fur Anorganiche und Allgemeine Chemie*, Band 298, 134–141 (1959); and (c) a liquid-to-liquid organic boundary phase reaction of silicon halide and ammonia at significantly subzero temperatures (see U.S. Pat. No. 4,196,178).

Each of the known methods for making imide or amide precursors suffers from certain deficiencies. Formation of a silicon amide or imide by a liquid-to-gas reaction results in poor purity of the resulting silicon nitride powder since a great deal of residual halides and carbon is present.

Forming silicon amide or imide by reacting a gas with a solid is disadvantageous because the exothermic reaction destabilizes the temperature of the ingredients, causing the solid ammonia to thaw. In the Glemser article, silicon chloride is transported under vacuum as a vapor to react with solid $NH_3$ at about −196° C. When the solid ammonia thaws, there is no means to control the reaction and, therefore, the process must be stopped to allow for the transport of the reaction mix to another station to eliminate the byproducts of the reaction, preferably through filtering. The reaction flask is warmed and is vigorously shaken. The reaction mix is not in intimate contact with any filter. This causes the entire processing to be accomplished in five to seven distinct stages or portions; the risk of plugging and contaminating the filter frit remains and can only be obviated by boiling the $NH_3$, changing the cooling bath to −80° C., and then cooling the second flask to −20° C. This cycling between −196° C. to −80° C. for the cooling bath and −80° C. to −20° C. for the second flask is repeated 10-12 times before continuing to add silicon chloride. This is an unusually complex and troublesome process procedure; it does not lead to a particularly purified product because of the transporting of byproducts between stages and through contaminating hoses and channels.

Forming silicon imides or amides by a liquid-to-liquid reaction holds a great deal of promise for providing purity in the resultant silicon nitride powder, but known techniques have found the reaction unusually violent and uncontrollable, as evidenced in U.S. Pat. No. 4,196,178 Ube. At column 1, lines 66-68 and column 2, lines 1-10, the reaction is indicated as being vigorously exothermic and evolves ammonium halide which will be given off as fumes unless contained. These fumes create uncontrolled deposition and plugging problems for the processing apparatus. If nothing further is done to the process other than to bring together such liquids at super-depressed temperatures, the uncontrollability of the reaction makes such process not only uneconomical but unfeasible for commercial use. The Ube patent attempts to provide some control to such reaction by incorporating an organic solvent immiscible in the liquid ammonia, thereby forming a interfacial surface through which the silicon halide slowly diffuses and only a small portion of the silicon halide additive reaches the liquid ammonia at any one specific moment. Although the violent and vigorous reaction is controlled somewhat, this is done at the extreme disadvantage of contaminating the resultant product with carbon carried by the organic solvent. In fact, the silicon halide is mixed with the organic solvent for purposes of transport into the reaction vessel. Not only is the change in the technical process not worth the disadvantage of severe carbon contamination, but the process is made uneconomical because it requires the added expense of organic solvent materials and handling costs, and the process must be carried out in interrupted batches since the chemical product cannot be immediately and simultaneously washed away with liquid ammonia due to the presence of the organic solvent. To carry out any washing and elimination of solid precipitates, other than the silicon imide, requires that the entire process be stopped and transferred to another vessel for cleansing.

The inventors in U.S. Pat. No. 4,196,178 mistakenly believed their powder was pure because they did not test for the presence of carbon. The off-white color of their calcined imide is due to the presence of carbon. Chemical analysis by high temperature combustion infrared analysis of the powder prepared by the method of U.S. Pat. No. 4,196,178 showed a presence of 1700 ppm carbon.

It is an object of this invention to provide a method of making an ultrapure silicon nitride precursor. A particular object of this invention is to form silicon imide or amide by a liquid-to-liquid reaction with greater controlability and without contamination.

SUMMARY OF THE INVENTION

The invention is a method of making such ultrapure silicon nitride precursor, comprising the steps of: (a) continuously reacting liquid silicon halide with an excess of liquid ammonia (i) in the effective absence of contaminants (ii) at a reaction situs in an inert atmosphere to form the silicon nitride precursor as a precipitate in an ammonia solution and (iii) with a ratio of excess liquid ammonia to silicon halide effective to substantially completely react the silicon halide and solubilize any gas reaction products and to maintain a sufficient viscosity of said ammonia solution with said solubilized gas reaction product to permit flow filtering;

(b) providing a pressure differential to permit simultaneously and continuously withdrawal of a filtered portion of the excess liquid ammonia and solubilized gas reaction products to leave the silicon nitride precursor precipitate in the reaction situs; and (c) adding ammonia to the reaction situs to replace the withdrawn filtered portion of the liquid ammonia and to assist in maintaining the liquidity of the excess of liquid ammonia.

Advantageously, the silicon halide comprises silicon tetrachloride, and the ratio of ammonia to silicon tetrachloride is maintained equal to or greater than 21 molar to insure the chemical reaction, the solubilization of ammonium chloride throughout the temperature range, and a necessary viscosity of the solution/suspension mix to permit flow filtering. Preferably, the reaction is carried out with vigorous stirring of the liquid mixture, and the atmosphere over the liquid mixture is regulated to contain only ammonia vapor and nitrogen. Preferably, the temperature of the liquid mixture is maintained by employing a cooling jacket containing dry ice or a slush of dry ice and acetone, isopropanol or cellosolve, and is continued to be maintained by recycling the withdrawn liquid ammonia and re-adding it to the reaction situs either as a liquid so as to lower the temperature of the mixture as a result of both the loss of heat due to evaporation when liquid ammonia is added and the cooled liquid ammonia itself, or to raise the temperature of the mixture as a result of the gain of heat from condensation when gaseous ammonia is added.

Advantageously, the resulting silicon nitride precursor will be silicon diimide, $Si(NH)_2$, and is characterized by a purity of at least 99.98%, an average particle size of less than one micron, dryness, and readily becomes statically charged due to the ultrapure surface and high surface area. The general formula for the silicon nitride precursor is $Si(NH_y)_z$, where y is 1 to 2, and z is 2 to 4; it is decomposable to silicon nitride having a high alpha content greater than 90% when heated to elevated temperatures. The silicon imide has silicon-nitrogen bonds and nitrogen-hydrogen bonds (as determined by infrared analysis) and it has the capability of reacting with water to form silica and ammonia.

SUMMARY OF THE DRAWINGS

FIG. 1 is a schematic illustration of the apparatus used in carrying out the process.

DETAILED DESCRIPTION

A liquid-to-liquid reaction of silicon halide and ammonia is difficult to control. A review of the disadvantages of U.S. Pat. No. 4,196,178 (to Ube) has previously been made to point out more distinctly the disadvantages overcome by this invention.

Essentially the invention comprises a process whereby (1) only silicon halide is continuously and reactively added to an excess pool of liquid ammonia at a reaction situs, (2) a filtered portion of the excess pool of liquid ammonia is simultaneously withdrawn carrying away solubilized ammonium halide and retaining any resultant silicon imide in the excess pool, and (3) ammonia is added back into the liquid excess pool of ammonia to replace withdrawn ammonia and in a physical condition to raise or lower the temperature of the reaction situs pool as needed so that it stays within the temperature range of $-33.5°$ C. to $-69°$ C. necessary to the liquidity of the ingredients.

Reacting the Ingredients

The ingredient employed in the reaction firstly comprises silicon halide, preferably silicon tetrachloride. $SiCl_4$ is normally obtained in a commercial purity equal to or greater than 99.95%, has a vaporization temperature of 57.57° C., and has a solidification temperature of $-70°$ C. Ammonia is liquified from a commercial form having a minimum purity of 99.99%. These ingredients are the only chemical parts to be combined and must be effectively free of contamination, including contaminants in the group of oxygen, carbon, metal, sulfur, water and solvents. The ingredients are combined in a molar ratio of ammonia to silicon halide equal to or greater than 21, which promotes the solubilization of one of the byproducts of the reaction, namely, ammonium halide. Without the use of a minimum molar ratio, the resultant byproduct would not be maintained as a solubilized product within the excess liquid ammonia pool and would undesirably codeposit as fumes if such molar ratio minimum is not maintained. It has been found that a molar ratio equal to or greater than 21 will be sufficient to accomplish the above.

The ingredients must be maintained in a liquid condition throughout the process which is conducted in the apparatus 15. To this end, an open end reaction vessel or flask 11 is preferably employed having a reaction situs 12 (see FIG. 1) and an inert filter 13 arranged for physical intimacy with the liquid reaction situs 12 (the pool of excess liquid ammonia). The filter communicates directly with an exit channel 14 so that excess liquid ammonia may be directly withdrawn during the reactive process, carrying away solubilized ammonium halide while retaining the precipitate of silicon diimide as a result of the use of a proper pore sized filter. The reaction vessel may be constructed of glass and teflon and is jacketed throughout so that a slush of cooling medium is maintained therein to insure the appropriate depressed temperature of the ingredients within the reaction vessel. Glass holding containers, 16-17 stationed above the reaction vessel, have necked glass tubes 16a and 17a respectively communicating these containers with the reaction situs within the reaction vessel. Holding container 16 contains recirculated ammonia and is effective to condense the ammonia with proper temperature control by way of jacketed material at 19. The other holding container 17 contains silicon tetrachloride which is supplied through conduit 30 and is fed to the reaction vessel by way of glass delivery tube 17a having a stopcock 20 therein to independently control the admission of such material. The supply of silicon tetrachloride may be facilitated by adding nitrogen gas to the mixture and the mixture then conducted to the reaction vessel. Inlet 21 is designed to receive gaseous ammonia and nitrogen and carry it to a point where it can be condensed. A jacketed delivery tube 16a may be employed to admit a direct supply of liquid ammonia. Outlet condenser 18 is exposed to ammonia or other vapors by conduit 18a and permits a pressure readout at 34. The jacketed exit channel 14 of vessel 11 communicates directly with one or more other glass holding containers 23a and 23b in which the solubilized ammonium halide may be separated as the ammonia is distilled therefrom and returned to the holding container 16 and inlet 21 through channel 24 for readmission to the reaction vessel. Containers 23a and 23b have nitrogen inlets 35 and 36 respectively. The cooling jacket of containers 23a and 23b may be removed from the apparatus if the rate of evaporation is to be increased. The jacketed exit channel 14 contains a glass frit entrance filter 13 which has a porosity effective to retain behind the silicon nitride precursor precipitate but allow dissolved materials in the liquid ammonia to be withdrawn therethrough. Ammonia, which has evaporated, communicates with channel 24 which receives such gas and eventually communicates with container 16 or inlet 21.

With respect to the mechanics of reacting the ingredients, the sequence involves the system of the reaction chamber 11, holding containers 16-17-23a and 23b condenser 18, and flow tubes or channels 16a-17a-18a-14 are evacuated to less than $10^{-2}$ mm pressure through conduits 31 and 37 with associated valves open; the system is then filled with pure nitrogen to just above atmospheric pressure; the reaction chamber 11 and holding containers 23a and 23b are cooled to preferably $-65°$ C.; the stirring device 26 is placed in motion; the reaction chamber 11 is filled through feed 21 with liquid ammonia to a desirable level to define an excess pool of liquid ammonia; and silicon tetrachloride is then added in droplets to the excess ammonia pool.

Simultaneous Withdrawal of Liquid Ammonia

The reaction of the combined ingredients results in the formation of a silicon nitride precursor precipitate having the formula $Si(NH_y)_z$, where y is 1-2 and z is 2-4. Preferably, the precursor is an insoluble silicon diimide. In addition, ammonium chloride is also formed but is solubilized in liquid ammonia. Thus, withdrawal of liquid ammonia from the excess pool through a filtering means results in the removal of ammonium chloride while leaving behind the silicon imide precipitate. A pressure differential exists between the withdrawal outlets (stop cocks 27a-b) and the reaction situs due to the vacuum on the flow tubes of the system and the introduction of nitrogen gas at a pressure slightly above atmospheric. To carry out the withdrawal function, stop cocks 27a-b are opened simultaneously, allowing the liquid ammonia and solubilized ammonium chloride to drain relatively rapidly due to the pressure condition of the reaction vessel or vacuum condition of the holding containers under which the reaction vessel is placed. The filter 13 can be a glass frit placed at the mouth of the exit channel and has a specific porosity to prevent the passage of the silicon imide.

Concurrent Adding of Ammonia

While liquid ammonia is withdrawn from the reaction situs 12, ammonia is replenished to the reaction chamber by way of channel 16a or 21. The container 16 receives its supply of recycled ammonia from the holding containers 23a and 23b which can be warmed to above $-33°$ C. to distill off ammonia gas into the holding container 16 leaving the precipitate, ammonium chloride, in the holding containers 23a and 23b. The solubilized ammonium chloride gas product can additionally be reacted with sodium hydroxide or potassium hydroxide as an additional source of ammonia gas for economy. The replenishment of additional ammonia or concurrent adding of recycled ammonia is carried out to maintain a liquid ammonia/liquid silicon tetrachloride molar ratio greater than 21. The ammonia can be recycled or added either in the gaseous or in the liquid condition depending upon the sensed temperature of the reaction situs at 28. If the sensed temperature (using temperature reader 28) within the reaction situs is too high, such as that above $-33°$ C., the ammonia can be added in the form of liquid ammonia after having been condensed so that the cooled liquid itself and/or loss of heat of evaporation upon such addition results in a cooling of the reaction situs. However, if the sensed temperature of the reaction situs is exceedingly low or beginning to go below $-69°$ C., the addition of ammonia can be in the form of a gas whereby the gain of heat from condensation of such added gas will raise the temperature of the reaction situs.

EXAMPLES

To corroborate the scope of the invention, certain examples of the process were carried out and resulting data is displayed in Table I. Each sample was prepared employing the apparatus as shown in FIG. 1 and requiring the basic sequence of (1) evacuating the system comprised of the reaction chamber 11, holding containers 16-17-18-23a and 23b and the flow tubes or channels 16a-17a-18a-14 to less than 10 mm, (2) filling the system with a gas of pure nitrogen (at least 99.998% pure) to just above atmospheric pressure, (3) cooling the reaction chamber and holding containers and flow tubes or channels to the range of $-65°$ C. to $-69°$ C. with a slush of dry ice and isopropanol while maintaining a positive nitrogen pressure, (4) placing the mechanical stirring device in motion, (5) filling the reaction chamber with liquid ammonia through feed 21, utilizing approximately 950 grams of liquid ammonia, to form an excess liquid ammonia pool, (6) adding 440 grams of silicon tetrachloride (maintained at about $-65°$ C.) in droplets to the excess liquid ammonia pool. At the same time, stop cocks 27a-b were opened to permit withdrawal of liquid ammonia containing dissolved ammonium chloride. Concurrently, continuous replenishment of the liquid ammonia was carried out by recycling the withdrawn liquid ammonia back to the holding container 16. The withdrawal rate was approximately 70 grams per minute.

After a period of about 30 minutes, a quantity of silicon imide was formed in an amount of 75 grams. When this collection amounted to a desired amount of about 150 grams, the entire process was considered complete and the resulting desired product was removed from the reaction chamber after evaporating the ammonia.

The samples were varied to illustrate certain aspects of this invention. The variances included: ratio of $NH_3/SiCl_4$, reaction temperature, contaminants, stirring, style of $SiCl_4$ addition, and use of ammonia replenishment. To determine the effects of these variances, the purity of the imide was measured, the average particle size measured, the presence of filter plugging, and the time needed to produce a specific quantity of silicon imide.

Analysis of the silicon imide of sample 1 showed that it possessed a pure white color, had an average particle size of less than one micron, was extremely dry, readily became statically charged due to the high surface area and ultraclean surface, contained silicon-nitrogen and nitrogen-hydrogen bonds, had a purity of 99.98% or greater, had the capability of decomposing under heat to form silicon nitride having greater than 90% alpha content, and had the capability of reacting with water to form silica and ammonia and having the capability of readily becoming statically charged. These characteristics resulted from control of the liquidity of the excess liquid pool, control of contaminants, and the simultaneous, continuous removal of a portion of the pool and solubilized ammonium chloride gas product.

Sample 2 was processed without a satisfactory excess of liquid ammonia as well as no continuous withdrawal of ammonia and solubilized ammonium chloride; as a result the precursor was contaminated with chlorine (ammonium chloride) and a required amount of precursor was never obtained due to filter plugging. The purity was less than 99.95% or greater than 500 ppm of chlorine.

Sample 3 was processed at too cold of a temperature ($-78°$ C.) permitting the ammonia and silicon tetrachloride to become solidified or highly viscous; as a result the process could not continue because the reaction control was lost. Sample 4 was processed at too high a temperature ($-10°$ C.) resulting in an inability to continuously withdraw liquid ammonia and loss of temperature control and proper reaction.

Sample 5 contained contaminants by use of a solvent resulting in an impure precursor of less than 99.95% or greater than 500 ppm of carbon contamination. Sample 6 lacked intentional continuous withdrawal of ammonia resulting in a loss of temperature control and reaction. The purity was low due to chlorine contamination. Sample 7 lacking stirring resulted in an ability to withdraw chlorides contained in all of the ammonia and thus a contaminated product. Sample 8 simply proves that the SiCl$_4$ can be added either in droplet form or in a stream while still obtaining good results.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

of contaminants, (ii) at a reaction situs in an effectively inert atmosphere to precipitate said silicon nitride precursor, and (iii) with a ratio of silicon halide to liquid ammonia effective to substantially completely react and to solubilize any gas reaction products and maintain required viscosity of solution/suspension mix for filtering;

(b) simultaneously and continuously filtering and withdrawing a filtered portion of said excess of liquid ammonia to leave said silicon nitride precursor precipitate in the reaction situs; and (c) adding ammonia to said reaction situs to replace the withdrawn filtered portion of said liquid ammonia and to assist in maintaining the liquidity of said excess of liquid ammonia.

2. The method as in claim 1, in which said silicon nitride precursor is silicon diimide.

3. The method as in claim 1, in which said silicon halide comprises silicon tetrachloride.

4. The method as in claim 1, in which the molar ratio of liquid ammonia to silicon halide in said reaction situs is maintained equal to or greater than about 21 molar.

5. The method as in claim 1, in which during step (a) the liquid silicon halide and excess liquid ammonia are stirred to homogenize the reactive mixture.

6. The method as in claim 1, in which during step (c) ammonia is added in either a gaseous or liquid form respectively to either raise or lower the temperature of the reaction situs and maintain the temperature of the reaction situs in the range of $-33.3°$ to $-69°$ C.

7. The method as in claim 1, in which in step (a) said atmosphere is comprised of mixed ammonia and nitrogen gas.

8. The method as in claim 1, in which the filtering and withdrawing in step (b) is obtained by drawing a vacuum on the reaction situs and introducing a nitrogen gas, at a pressure above atmospheric to form said inert atmosphere.

TABLE I

| Sample | NH$_3$/SiCl$_4$ Ratio | Temp. of Reaction Mixture | Presence of Contaminants | Use of Stirring | Style of SiCl$_4$ Addition | Continuous Withdrawal & Replenishment of NH$_3$ | Filter Plugging | Purity of Resultant Precursor | Average Particle Size of Precursor | Time Period for Processing 150 Grams of Silicon Imide |
|---|---|---|---|---|---|---|---|---|---|---|
| 1 | >21 | −65 | None | Yes | Drops | Yes | No | >99.98% | Less than one micron | 30 min. |
| 2 | 10 | " | " | " | " | No | Yes | Less than 99.95% | — | Never attained |
| 3 | 40 | −78 | " | Difficult | " | Difficult (too viscous) | Yes | — | Viscous polymer not powder | Lost reaction control |
| 4 | 40 | −10 | " | Yes | " | No (ammonia gas not condensed) | Yes | Low | Mixed products | Lost temp. control |
| 5 | 40 | −50 | Toluene solvent used | " | " | No | Yes | Carbon contamination | — | — |
| 6 | 40 | −50 | None | " | " | No | — | Low | — | Lost Temp. Control |
| 7 | 40 | −50 | " | No | " | Unable to withdraw | Yes | Chlorine contamination | — | Lost ammonium chloride cleansing control |
| 8 | 40 | −65 | " | Yes | Stream | Yes | No | >99.98% | Less than one micron | 30 min. |

We claim:

1. A method of making a silicon nitride precursor of a purity greater than 99.95%, comprising:

(a) continuously reacting liquid silicon halide with an excess of liquid ammonia (i) in the effective absence 9. A method of making a precursor of a purity above 99.95%, useful in the making of silicon nitride, comprising the steps of:
   (a) reacting, while continuously stirring a mixture of liquid silicon halide and liquid ammonia in the effective absence of contaminants, and filtering said mixture through a filter means, intimate contact with the mixture, to prevent the passage of any precipitates from said liquid mixture and withdrawing the filtered liquids; and
   (b) simultaneously adding ammonia to said mixture so as to (i) compensate for withdrawal of any liquid ammonia through said filter means and (ii) control the temperature of said mixture to maintain liquidity of said silicon halide and ammonia.

10. The method as in claim 9, in which said silicon halide comprises silicon tetrachloride.

11. The method as in claim 9, in which said precursor is silicon diimide.

12. The method as in claim 9, in which said precursor has 99.98% purity.

13. The method as in claim 9, in which said precursor has an average particle size of less than one micron.

14. The method as in claim 9, in which said precursor is $Si(NH_y)_z$, where y is 1-2, z is 2-4, and is decomposable when heated.

15. The method as in claim 9, in which the mixture employed has been formed by adding drops of silicon halide to an excess pool of liquid ammonia.

16. The method as in claim 9, in which said mixture has a molar ratio of ammonia to silicon halide equal to or greater than 21.

17. The method as in claim 9, in which during step (b) said ammonia is added without interruption of the reaction of step (a).

18. The method as in claim 9, in which during step (b) ammonia is added either as a liquid when cooling or as a gas when heating, said addition being in response to a monitored temperature of said mixture.

19. A method of making $Si(NH_y)_z$, of a purity above 99.95% where y is 1-2 and z is 2-4, useful as a precursor for making silicon nitride, comprising the steps of:
   (a) preparing an open end reaction vessel having a liquid reaction situs and an inert filter arranged for physical intimacy with said liquid reaction situs, said filter communicating with an exit channel;
   (b) repeatedly adding liquid silicon tetrachloride to a pool of excess liquid ammonia in said reaction situs of said reaction vessel, both of the additives being substantially free of oxygen, carbon, sulfur, metal, water or solvent contaminants, to chemically react and form said $Si(NH_y)_z$ and ammonium chloride;
   (c) without interrupting said chemical reaction, simultaneously and continuously (i) stirring said pool to assist in maintaining said ammonium chloride in a dissolved condition within said liquid ammonia, (ii) removing liquid ammonia carrying said ammonium chloride through said filter and away from said pool in said reaction situs, and (iii) adding either liquid or gaseous ammonia to said pool in said reaction situs in an amount to compensate for removal of any liquid ammonia from said reaction situs and to control the temperature of said reaction situs to be substantially within the range of $-33.3°$ to $-69°$ C.

20. The method as in claim 19, in which during step (b) said liquid silicon tetrachloride is added to said excess liquid ammonia to provide an ammonia to silicon tetrachloride molar ratio equal to or greater than 21.

21. The method as in claim 19, in which during step (a) said filter is integrally attached to the bottom of said reaction vessel.

22. The method as in claim 19, in which during step (b) said silicon tetrachloride is repeatedly added by droplets to said excess liquid ammonia.

23. The method as in claim 19, in which during step (c)(i) stirring is carried out vigorously to insure complete reaction and homogeneity.

24. The method as in claim 19, in which said exit channel is comprised of glass and teflon and said vessel is constructed of glass and teflon.

25. The method as in claim 19, in which during step (c) (iii) the control of temperature is effected by selecting liquid or gaseous ammonia when adding ammonia to the reaction situs.

26. The method as in claim 19, in which said removal during step (c) is carried out under a vacuum.

27. The method as in claim 19, in which additional ammonia is released to said pool in step (c) (iii) by reacting sodium or potassium hydroxide with said ammonium chloride.

* * * * *